Aug. 21, 1962 W. R. McLAIN 3,049,814
EDUCATIONAL BLOCKS
Filed Nov. 7, 1961 2 Sheets-Sheet 1
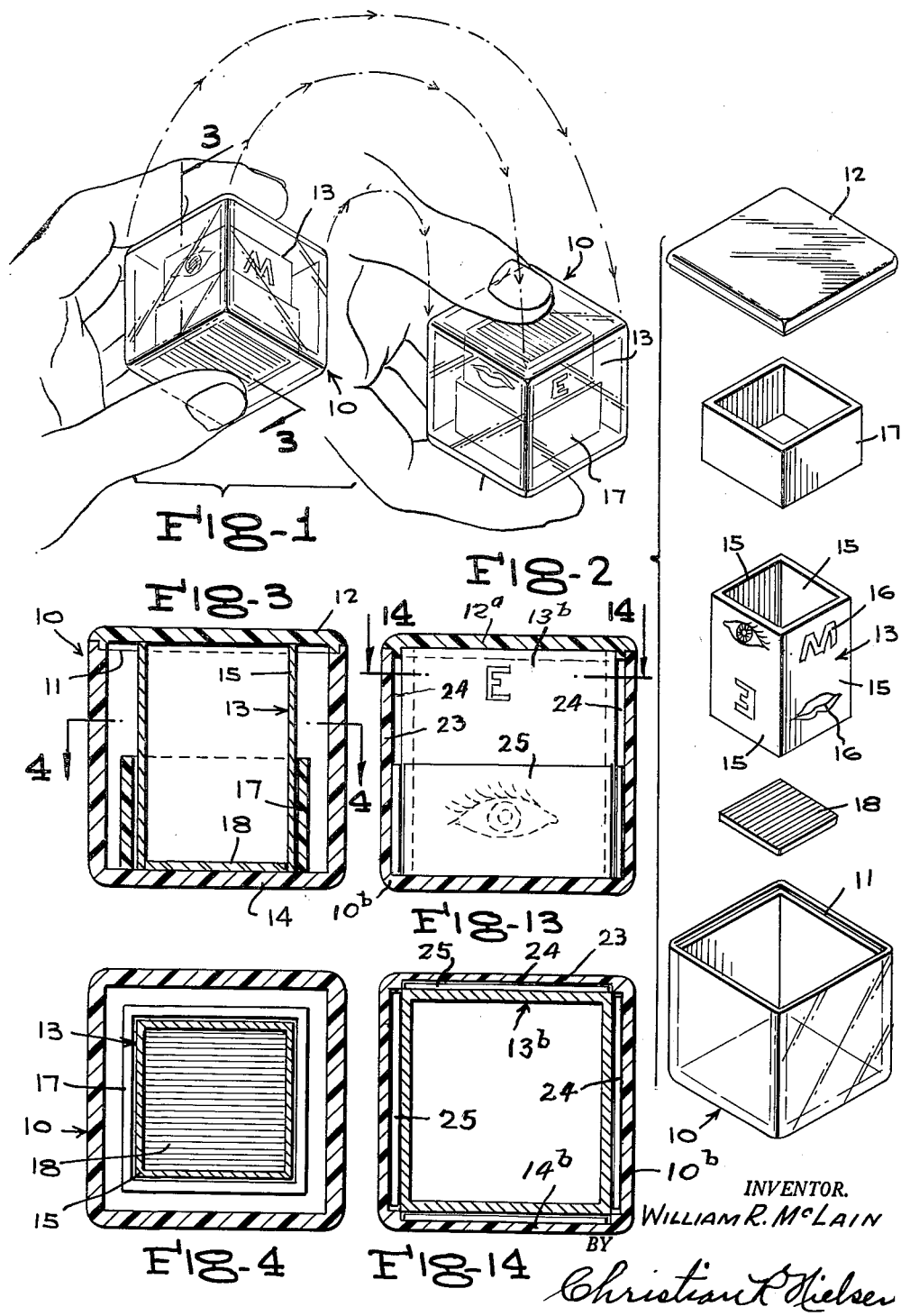
INVENTOR.
WILLIAM R. McLAIN
BY Christian D. Nielsen
ATTORNEY

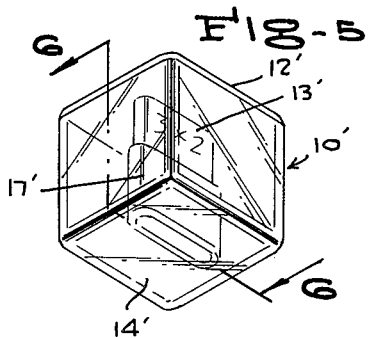
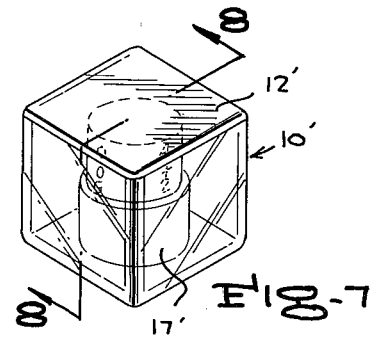
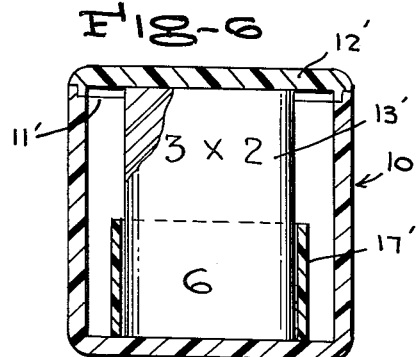
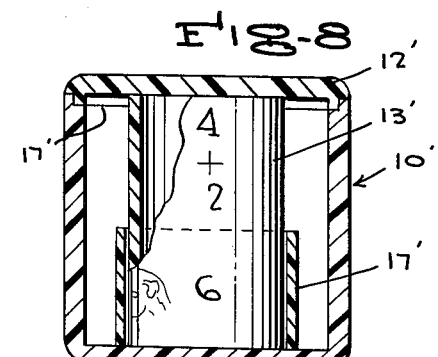
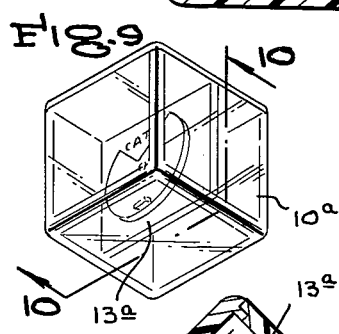
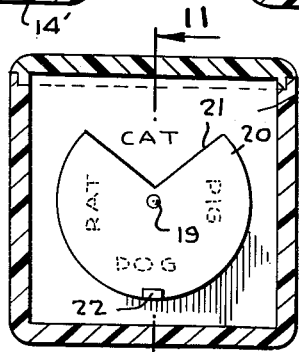
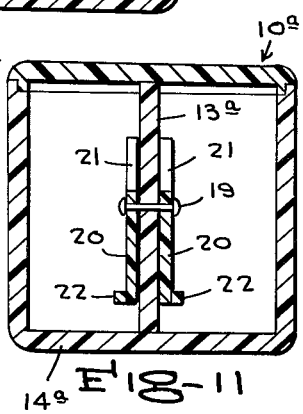
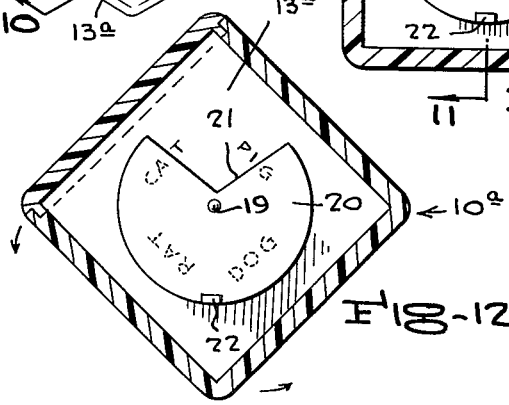

3,049,814
EDUCATIONAL BLOCKS
William R. McLain, Nashville, Tenn., assignor to Kusan Incorporated, Davidson, Tenn.
Filed Nov. 7, 1961, Ser. No. 150,745
9 Claims. (Cl. 35—70)

This invention relates to hollow transparent educational blocks suitable for amusement and instruction of children and it consists in the constructions, arrangements and combinations herein described and claimed.

It is the cardinal object of the invention to provide a hollow transparent block wherein the block comprises a rigid member fixed secure between side walls of the block for support of a shutter-like member which will alternately expose and conceal indicia, such as pictures, letters, words or numerals formed on the rigid member upon reversal or agitation of the block.

More specifically, it is an important object of the invention to provide a transparent hollow block wherein the block comprises a rigid member fixedly secured between a pair of opposed walls of the block, the rigid member having indicia such as pictures, letters, words or numerals formed thereon; a movable shutter-like member being operatively associated with the rigid member for alternately exposing and obscuring said indicia upon reversing or rotating the position of said block.

Additional objects, advantages and features of invention will be apparent from the following description, considered in conjunction with the accompanying drawings, wherein, FIGURE 1 is a perspective view of the transparent block, illustrating a first and second position of the block to expose indicia within the block, as well as to conceal indicia thereof.

FIGURE 2 is an exploded perspective view, illustrating the several parts constituting the transparent block.

FIGURE 3 is a section taken on the line 3—3 of FIGURE 1.

FIGURE 4 is a cross section taken on the line 4—4 of FIGURE 3.

FIGURE 5 is a perspective view of a modified form of block.

FIGURE 6 is a sectional view taken on the line 6—6 of FIGURE 5.

FIGURE 7 is a perspective view of a further modification of the block.

FIGURE 8 is a section taken on the line 8—8 of FIGURE 7,

FIGURE 9 is a perspective view of a still further modification of the block.

FIGURE 10 is a sectional view taken on the line 10—10 of FIGURE 9.

FIGURE 11 is a sectional view taken on the line 11—11 of FIGURE 10.

FIGURE 12 is a cross sectional view illustrating the manner of exposing indicia on the fixed member within the block.

FIGURE 13 is a sectional view illustrating a still further modified form of the block, and FIGURE 14 is a cross section taken on the line 14—14 of FIGURE 13.

It will be understood that the hollow transparent block may be formed in various configurations as well as dimensions.

Attention is now invited to FIGURES 1 to 4 wherein there is shown a cubical member 10 having an open end 11 by means of which the operative parts housed within the cubical member may be installed, after which the open end may be closed by a wall 12 which is permanently sealed in the open end of the block.

The cubical member 10 comprises, as best seen in FIGURES 2 and 3, an indicia bearing sleeve 13, preferably formed from a suitable plastic material, having a length to be firmly secured between the wall 12 and an opposed wall 14 of the cubical member.

The sleeve 13 is in the form of an open-ended cube providing respective wall surfaces 15 upon which indicia 16 may be positioned at respective ends thereof and as shown, the indicia in one instance, comprises the representation of a human mouth at one end of the wall surface 15, while at the opposite end of said wall surface there is shown the letter "M" representing the first letter of the word "mouth." Each of the remaining walls of the sleeve will likewise embody an object and a letter, the former representing a question and the latter the answer thereto.

A shutter-like member 17 is employed, which is freely slidable upon the sleeve 13, to alternately expose the indicia at one end of the sleeve and conceal the indicia at the other end when the block 10 is reversed end for end. The shutter-like member 17 is formed from an opaque plastic and is of a length approximately one-half the length of the sleeve 13 so that the shutter may have movements sufficient to expose the indicia at one end and conceal indicia at the other.

In order to create interest of children in the educational block, when the block is given motion to and fro or sideways, the shutter-like member 17 will contact the walls 12 and 14 alternately to produce a sound effect and additional sound effects can be produced in the provision of a loose piece of plastic material 18 which is disposed in the sleeve 13.

Reference is now made to FIGURES 5 to 8 of the drawings, where parts corresponding to those shown in FIGURES 1 to 4, are identified by primed reference characters. The only structural differences between the several forms residing in the shape of the indicia bearing members 13 and 13' and the shutter members 17 and 17'. In the form of the indicia bearing member 13' shown in FIGURES 5 and 6, only two sides are available for display of indicia; while in FIGURES 7 and 8, the sleeve 13' being of cylindrical shape, any practical number of surfaces are available for display of indicia thereon.

In the form of block 10a shown in FIGURES 9 to 12, the rigid indicia bearing member 13a is in the form of a flat wall and may be formed as an integral part of the wall 14a. Intermediate the height of the member 13a, a pivot pin 19 rotatably mounts a pair of disk members 20, one upon opposite faces of the member 13a. Each disk will be formed with a cut away portion 21 and diametrically opposite the cut away portion, each disk is provided with a weight member 22. In this particular showing of the block, I have preferred to use words as the indicia to be alternately concealed and exposed, and accordingly the indicia will be formed upon respective sides of the member 13a so that as the block is rotated as shown in FIGURE 12, the disks 20 will remain stationary due to the weight members 22 and since the indicia bearing plate 13a is an integral part of the block and moves therewith, the words thereon will be alternately exposed and concealed at the cut away portions 21 of the disks.

In the modified form of the block 10b shown in FIGURES 13 and 14, the indicia bearing member 13b is in the form of a cube, of such dimensions as to snugly fit between the bottom wall 14b and top wall 12a. The inner faces of the side walls 23 of the block 10b are provided with respective recesses 24 extending vertically from top to bottom for slidably supporting an individual shutter 25.

While I have shown and described preferred forms of the block, this is by way of illustration only, and I consider as my own all such modifications in construction as fairly fall within the scope of the appended claims.

I claim:

1. A hollow transparent educational block comprising a rigid hollow indicia bearing member interiorly of said block, the indicia on said member being positioned inwardly of respective ends thereof, a shutter member slidably supported by said indicia bearing member, said indicia bearing member being hollow, a plastic member freely housed in said indicia bearing member, said shutter member being movable to alternately conceal and expose the indicia on said indicia bearing member under movement of the block to effect movement of said shutter and said freely housed plastic member toward and away from respective ends of said indicia bearing member.

2. The structure as defined in claim 1 wherein a sound effect is produced upon contacting engagement between said shutter member and the opposed walls of said hollow plastic block as the shutter member abuts and engages the walls of the block.

3. The structure of claim 1, in which a sound effect is produced upon contacting engagement between said shutter member and opposed walls of said hollow plastic block, and wherein additional sound effects result upon contacting engagement between said freely housed plastic member within said hollow indicia bearing member.

4. A hollow transparent educational block comprising a rigid indicia bearing member interiorly of said block, a disk member mounted on said indicia bearing member in advance of said indicia bearing member, said disk having a cut away portion to expose and conceal indicia upon said indicia bearing member upon rotation of said hollow block.

5. A hollow transparent educational block comprising a rigid indicia bearing member interiorly of said block, a disk member upon opposite sides of said indicia bearing member, each of said disks having a cut away portion to alternately expose and conceal indicia upon said indicia bearing member upon rotation of said hollow block.

6. The structure of claim 4, in which said disk is is provided with a weight means positioned opposite said cut away portion.

7. The structure of claim 5, in which each of said disks is provided with a weight means positioned opposite said cut away portion.

8. A hollow transparent educational block comprising a rigid cubical shaped indicia bearing member interiorly of said block, the walls of said indicia bearing member being closely spaced to the inner faces of the walls of said block, and each of the faces of said block having a recess for slidable support of a shutter member.

9. An educational block consisting solely of an outer member of hollow formation having transparent sides, an indicia bearing member arranged within said outer member, the ends of said indicia bearing member being affixed to the ends of said outer member, a shutter member slidably supported on said indicia bearing member, said shutter member being of a length and movable to alternately conceal and expose the indicia on said bearing member upon movement of said block to effect movement of said shutter member towards and away from respective ends of said indicia bearing member, said shutter member abutting and contactingly engaging opposed ends of said outer member as said block is manually manipulated to produce a sound effect, said shutter member being of a size so that it covers less than the entire area of the indicia on the bearing member so that in one position of the shutter member, part of the indicia is exposed and another part of the indicia is covered, and in another position of the shutter member, another part of the indicia is exposed and at least part of the indicia previously exposed is now covered; said shutter member, outer member, and bearing member each including a plurality of angularly arranged plane faces, and wherein the angulation between the plane faces of the bearing member is the same as the angulation between the plane faces of the outer member and shutter member, the plane faces of the bearing member defining and providing separate areas and sections for the indicia.

References Cited in the file of this patent

UNITED STATES PATENTS 2,264,194    Wuestman _____ Nov. 25, 1941